June 27, 1972    E. BONNIER ET AL    3,672,872
METHOD OF SEPARATION OF A SUBSTANCE IN A SOLID OR
LIQUID PHASE FROM A MATRIX IN THE LIQUID PHASE
Filed June 1, 1970    3 Sheets-Sheet 1

Inventors
E. BONNIER
C. ALLIBERT
J. DRIOLE
A. WICKER
By Holcombe, Wetherill + Brisebois
Attorneys United States Patent Office 3,672,872
Patented June 27, 1972

3,672,872
METHOD OF SEPARATION OF A SUBSTANCE IN A SOLID OR LIQUID PHASE FROM A MATRIX IN THE LIQUID PHASE
Etienne Bonnier, Colette Allibert, Jean Driole, and Alain Wicker, Grenoble, France, assignors to Agence Nationale de Valorisation de la Recherche, Puteaux, France
Filed June 1, 1970, Ser. No. 42,307
Int. Cl. B23d 1/00; C22b 7/00; C22c 1/00
U.S. Cl. 75—63          11 Claims

ABSTRACT OF THE DISCLOSURE

A method of separation of a substance in a solid or liquid phase from a matrix in the liquid phase, at high temperature, by the creation of an alternating magnetic field of medium frequency in the composite mixture formed by said substance and said matrix, followed by a solidification tempering action. A device for carrying the method into effect comprises a crucible, heating means for the crucible, an inductor winding around the said crucible, and further comprises a medium-frequency alternating-current generator, of 10 kilocycles for example, associated with the winding. The inductor winding on the crucible may serve simultaneously as the heating means for the crucible and the electro-magnetic separating means, or the heating may be independent of the electro-magnetic means and may be constituted by an electrical resistance.

---

The methods at present employed for separating, at a relatively high temperature, a substance in the solid phase from a matrix in the liquid phase, consist generally of a filtration, a liquation or a centrifugation. Any one of these methods is utilized, depending on the characteristics of temerature, compatibility of the materials employed, forces to be overcome (gravity, viscosity, surface tension). These methods can hardly be used when the preparation temperature is relatively high, for example of the order of 2,000° C., by reason of the bad mechanical and chemical behaviour of the materials, or alternatively because of the numerous technological difficulties which are encountered.

There has also been proposed an electro-magnetic method of separation of a substance in a solid phase from a molten metal by the establishment in the composite mixture of an alternating magnetic field and the passage of an alternating current through the said mixture. This method of procedure has however the drawback that it is difficult, if not impractical, when the working temperature is high, since then the problem arises of the connection terminals for the establishment of the electric current which co-operates with the magnetic field.

The present invention relates to a method of separation which is simple in its application, even at very high temperatures. In the method according to the invention, the alternating magnetic field is established, in the composite mixture formed by the substance in the solid phase and the matrix in the liquid phase at high temperature, with a frequency hereinafter known as a "medium frequency" such that the induced currents are largely developed inside the composite mixture. The electro-magnetic forces which are developed in this composite mixture are generally produced in a different manner in the two phases and induce in this way a movement of separation of the solid phase with respect to the liquid phase, or vice versa, which results in the separation of the solid body from the liquid matrix.

This difference in behaviour of the solid and liquid phases under the action of an alternating magnetic field of a medium frequency results from an interaction of numerous physical characteristics of the phases in presence, especially of the resistivity, surface tension, etc., and it has not been possible at the moment to set forth a general law which will make it possible to predict which composite mixtures are capable of electro-magnetic separation in this manner and which are those in which the action of the electro-magnetic forces is not sufficient to cause this separation.

It will be noted that this method is very different from the method of electro-magnetic levitation which consists in causing the maintenance in space or in a medium of low density of a homogeneous substance constituted for example by a metal. In the phenomenon of levitation, it is not a question of separating two substancès, but only of maintaining a single in its position. The present case has nothing of this kind, the method utilized enabling the extraction of a substance to be effected whether it is of higher or lower density than that of the liquid matrix; the extraction performance depends essentially on the physical characteristics which have been referred to above. In a particular embodiment of the invention, the operation is carried out at a temperature such that at least two liquid solutions are formed, if so required in the presence of at most one solid solution. This method of operation gives a remarkable extension to the method.

The present invention also has for its object a device for carrying into effect the method referred to above, of the kind comprising a crucible, means for heating the said crucible and an induction winding round the said crucible, and the characteristic feature of this device resides in that this induction winding is supplied with alternating current at medium frequency, suitable for working inside the composite mixture and of a high temperature, so as to effect the separation of the composite products placed in the crucible. In a preferred embodiment, the inductor winding itself constitutes the heating means.

Certain particular features of the invention and the results which it achieves will now be brought out in the following description below, given by way of example with reference to the accompanying drawings, in which.

Figure 1:
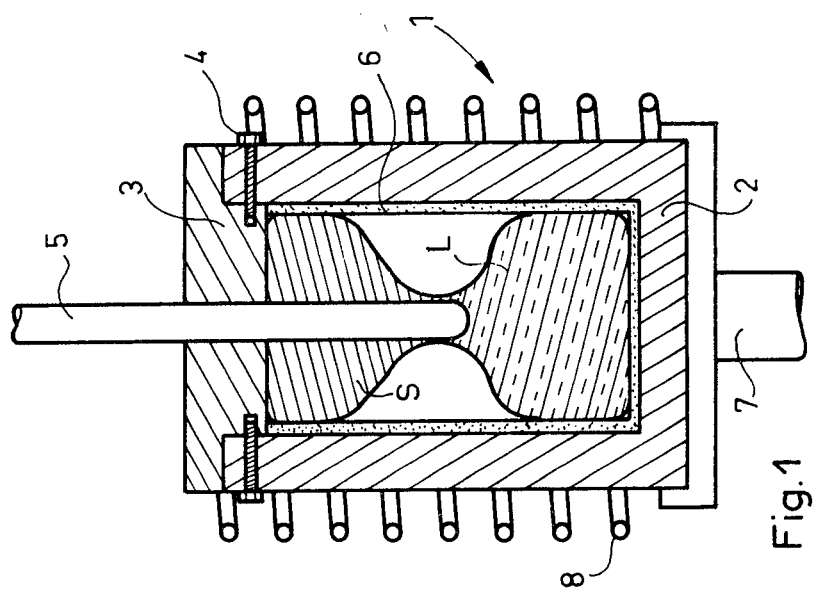
FIG. 1 is a view in cross-section of a crucible containing the composite product, at the end of the electro-magnetic separation.

Referring to FIG. 1, it is seen that a crucible 1 comprises a graphite body 2, surmounted by a cover 3, also of graphite, attached to said body by bolts 4, the cover 3 being traversed by a thermometer probe 5 projecting into the open space within the crucible 1. It can be seen that the inside of the crucible is covered with a lining 6 of zirconia. The whole is mounted on a molybdenum support 7 which extends over the base of the crucible body 2.

Figure 3:
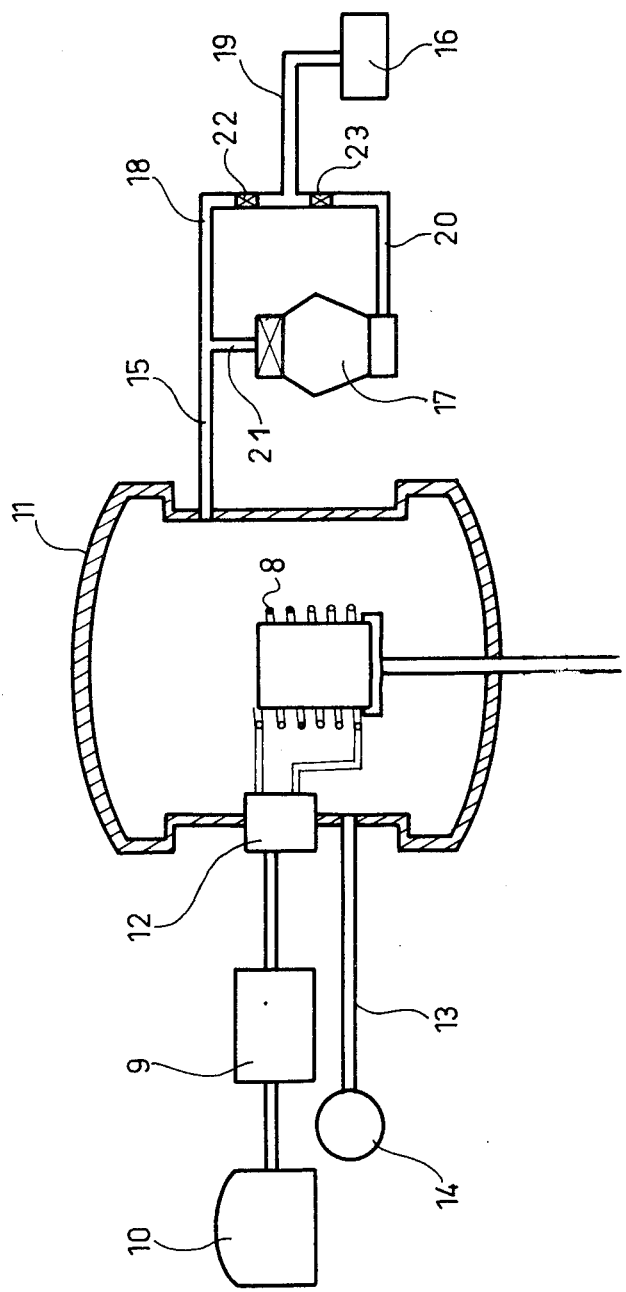
FIG. 3 is a general diagrammatic view of an installation for carrying into effect the method according to the invention.

Around the crucible 1 is fixed an induction winding 8 which, as shown in FIG. 3, is supplied from a medium-frequency oscillation generator 9, in turn supplied from an alternator 10 at a frequency of 10 kc. The assembly of the crucible 1 and the induction winding 8 is placed in a fluid-tight chamber 11, the electric supply circuit for the winding 8 passing through the said chamber 11 by means of a fluid-tight bushing 12. The chamber communicates through a conduit 13 with a source of helium 14, while a conduit 15 is connected to a primary vacuum pump 16 and a diffusion pump 17, through the conduits 18, 19, 20, 21 and the valves 22 and 23. Generally speaking, the induction winding 8 is constituted by a tube which is water cooled in a manner well known per se.

The procedure is carried out in the following manner:

The products to be prepared are introduced into the crucible 2 and the chamber 11 is pumped to a complete vacuum by the successive use of the primary pump 16 and then the diffusion pump 17. Helium or other neutral gas is then admitted through the conduit 13 coming from the source 14, so that the chamber 11 is entirely filled with this neutral gas. The oscillating circuit 9 is tuned to a medium frequency, for example of the order of 10 kilocycles.

In the present case, the induction currents which are produced in the composite mixture placed inside the crucible through the intermediary of the inductor winding 8, first result in heating of the composite products until partial melting is obtained, while the thermo-dynamic equilibrium of the phases in presence is effected at the working temperature. Without describing in detail the operating procedure, which does not form part of the present invention, it is indicated however that this method of procedure is employed for the preparation of solid solutions in the presence of a liquid phase which is itself formed by an alloy. It has been found during the preparation phenomenon, that even in the course of preparation of the solid solution, the solid phase tends to rise towards the top, while the liquid phase remains in the lower portion.

As can be seen from FIG. 1, at the end of the operation of preparation, the body in the solid phase has collected in a mass S in the upper part around the thermometer sheath 5, while the liquid phase forms a lower mass L, entirely separated from the solid mass S. When the operation of preparation and separation has been completed, it is only necessary to carry out a rapid cooling of the crucible. This can advantageously be effected by a circulation of helium from the source 14. The composite substance extracted from the crucible can be separated into two quite distinct parts, and it is found by micrographic and chemical analysis that the desired results are in fact obtained.

Figure 2:
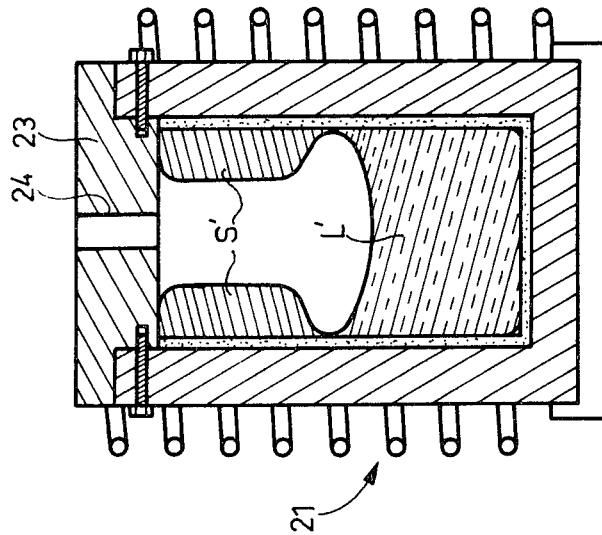
FIG. 2 is an alternative form of construction of a crucible for carrying out the method according to the invention.

Referring now to FIG. 2, there is provided in this case a crucible 21, the general construction of which is substantially the same as that shown in FIG. 1, with the difference that the cover 23 no longer receives a thermometer sheath which passes into the interior of the crucible, but comprises simply a perforation 24 which serves for the measurement of the temperature by an optical pyrometer. In this case, experience has shown that under the same operating conditions as those previously described, the composite material becomes separated into two parts, one formed by the liquid phase L' in the lower portion of the crucible, the other by the solid phase S' which, in this case has collected in the upper portion of the crucible 21 and against the side walls thereof.

In the examples which have been described above, the operating procedure involved the utilization of the method of electro-magnetic separation simultaneously with heating by induction, and the means employed for this application are the same and are constituted by the inductor winding.

In certain cases, a method can be employed which utilizes electro-magnetic separation, not simultaneously with the heating operation, but in a terminal phase of this heating operation. Any conventional heating means may be employed, the superimposition of an alternating electro-magnetic induction field at medium frequency effecting the separation at the end of the treatment.

Two examples of the application of the method according to the invention will now be given, using a device such as illustrated in FIG. 3, and a crucible in accordance with FIG. 1 or FIG. 2. These two examples are limited to the production of an alloy of niobium/tungsten by the preparation of a solid solution inside a matrix with a base of copper, at a temperature of the order of 1900° C. There exists an effective thermo-dynamic equilibrium between a liquid phase formed by a solution of copper/niobium and a solid phase formed by a solid solution of niobium/tungsten.

EXAMPLE 1

There are available copper, niobium and tungsten in proportions of 80 grams of copper, 10 grams of niobium and 5 grams of tungsten. This mixture, in granular form for example, is introduced into a cylindrical crucible of the type described with reference to FIG. 1. Heating is effected by induction at medium frequency, of the order of 10 kc., with a power of about 15 kw. When the temperature of 1900° C. is reached, this is maintained for one hour, which is sufficient to ensure thermo-dynamic equilibrium. After tempering and complete cooling of the sample, it is found that a solid phase S and a liquid phase L exist inside the crucible, such as shown in FIG. 1, and which have been previously described. It is verified that the solid mass has its origin in a solid solution of niobium/tungsten at 28% of niobium and 72% of tungsten.

EXAMPLE 2

There are available copper, niobium and tungsten in the proportions of 60 grams of copper, 32 grams of niobium and 8 grams of tungsten, which are placed in a crucible such as that described in FIG. 2, and after a period of maintenance at a temperature of 1900° C., a tempering is effected and the final cooling of the crucible is carried out.

It is then found that the two phases are arranged in the manner described with reference to FIG. 2. The solid phase S' results from a solution of niobium-tungsten having a composition of 50% of tungsten and 50% of niobium and weighing about 12 grams.

Figure 4:
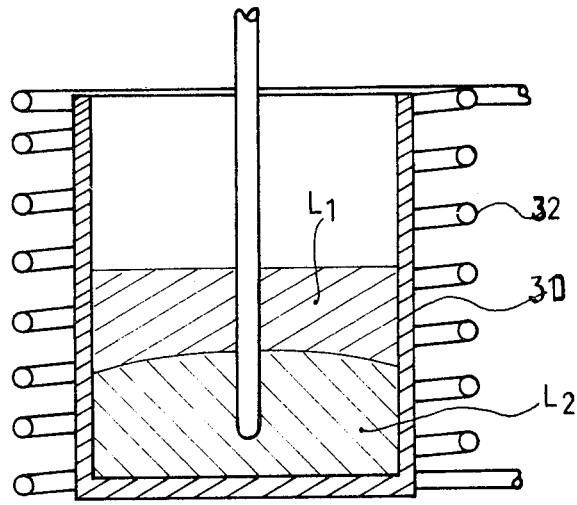
FIGS. 4 and 5 are views similar to FIG. 1 of two further alternative forms of application.

EXAMPLE 3 (With reference to FIG. 4)

In a crucible 30, there is melted a mixture of iron (30% by weight) and tin (70% by weight). The temperature is increased up to 1400° C. and this is maintained for a certain time, which ensures the formation of two liquid solutions.

An induction coil 32 which ensures the heating and which causes the melting, creates an alternating electro-magnetic field of medium frequency which effects the separation of the two liquids. A rapid tempering of the sample results at ambient temperature in the crucible 30, in a mass L1 of a liquid rich in iron and a mass L2 of a second liquid rich in tin. It should be observed that these two liquids have practically the same density and that therefore this separation is not possible by simple decantation.

EXAMPLE 4 (With reference to FIG. 4)

The starting substance is a mixture of copper (60% by weight), niobium (20% by weight) and molybdenum (20% by weight). By proceeding in the manner indicated above, but at a temperature of the order of 2100° C., there are obtained two liquids L1 and L2 having the following compositions:

L1: Cu 91%, Nb 6%, Mo 3%
L2: Cu 18%, Nb 36%, Mo 46%

Figure 5:
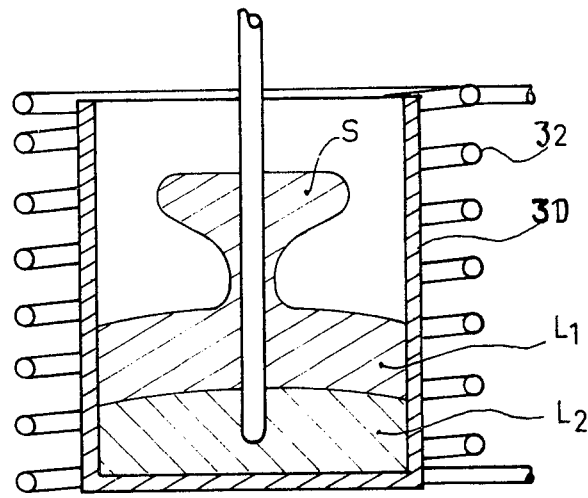

EXAMPLE 5 (With reference to FIG. 5)

A mixture of copper (50%), niobium (20%), and molybdenum (30%) is heated to 2100° C. There are formed three phases, namely two liquid phases and a solid phase. Electro-magnetic separation takes place, and after having tempered the alloy, there is obtained a mass constituted by a solid S and two liquid phases L1 and L2, the compositions of which are as follows:

S: Cu 0%, Nb 25%, Mo 75%
L1: Cu 95%, Nb 3%, Mo 2%
L2: Cu 15%, Nb 32%, Mo 53%

The invention is not limited to the methods of application which have been given above and, as has been previously indicated, it has not been possible to give absolutely reliable criteria which make it possible to state beforehand that a certain composite substance can be subjected to electro-magnetic separation, in view of the obvious complexity of the operating conditions. It is certainly only by tests repeated each time that it is possible to conclude that a certain composite substance is or is not suitable for this method of operation which utilizes electro-magnetic separation.

The methods of operation of the device which has just been described can be used for the preparation of alloys which are utilized for any application, but they are more particularly applied to the preparation of refractory alloys, especially those utilized in aeronautical construction.

What we claim is:

1. Method of separating an alloy of refractory metals in a non-gaseous phase from a mixture comprising both the constituents of said alloy and a carrier metal having a lower melting point than said refractory metals, which mixture, when at an elevated equilibrium temperature, comprises a plurality of phases at least one of which is liquid and one of which contains a larger proportion of said alloy than any other, said method comprising the steps of heating said mixture to said equilibrium temperature, establishing an alternating magnetic field of the order of 10 kilocycles per second in said mixture until said phases separate and then rapidly cooling said metals.

2. Method as claimed in claim 1 in which said refractory metals are selected from the group consisting of niobium, tungsten, and molybdenum.

3. Method as claimed in claim 2 in which said carrier metal is copper.

4. Method as claimed in claim 1 in which one of said refractory metals is niobium.

5. Method as claimed in claim 1 in which said mixture is inductively heated and said magnetic field simultaneously established by the same alternating electric current.

6. Method as claimed as claim 1 in which at least two distinct liquid phases exist.

7. Method as claimed in claim 1 in which said magnetic field is established in said mixture before the equilibrium temperature has been reached.

8. Method as claimed in claim 1 in which said magnetic field is established in said mixture after the equilibrium temperature has been reached.

9. Method as claimed in claim 1 in which said phase containing a larger portion of said alloy is solid.

10. Method as claimed in claim 1 in which said mixture comprises only two phases at said equilibrium temperature, one of which is solid and consists essentially of said alloy, while the other is liquid and consists principally of said carrier metal.

11. Method as claimed in claim 1 in which said mixture is heated in an inert atmosphere.

References Cited
UNITED STATES PATENTS

| | | | |
|---|---|---|---|
| 3,466,154 | 9/1969 | Hori et al. | 204—186 X |
| 2,072,907 | 3/1937 | Rowand | 209—214 |

JOHN H. MACK, Primary Examiner

NEIL A. KAPLAN, Assistant Examiner

U.S. Cl. X.R.

75—84, 135; 209—179, 214, 215; 210—42, 222